US012073987B2

(12) United States Patent
Takai et al.

(10) Patent No.: US 12,073,987 B2
(45) Date of Patent: Aug. 27, 2024

(54) MULTILAYER COIL COMPONENT

(71) Applicant: Murata Manufacturing Co., Ltd., Kyoto-fu (JP)

(72) Inventors: Shun Takai, Nagaokakyo (JP); Atsuo Hirukawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 830 days.

(21) Appl. No.: 17/133,496

(22) Filed: Dec. 23, 2020

(65) Prior Publication Data

US 2021/0202163 A1 Jul. 1, 2021

(30) Foreign Application Priority Data

Dec. 27, 2019 (JP) ................................ 2019-238915

(51) Int. Cl.
*H01F 27/32* (2006.01)
*H01F 17/00* (2006.01)
*H01F 27/29* (2006.01)

(52) U.S. Cl.
CPC ....... *H01F 27/324* (2013.01); *H01F 17/0013* (2013.01); *H01F 27/292* (2013.01)

(58) Field of Classification Search
CPC ... H01F 27/324; H01F 17/0013; H01F 27/292
See application file for complete search history.

(56) References Cited

U.S. PATENT DOCUMENTS

2004/0084131 A1* 5/2004 Konoue ................ H01F 41/046 156/89.12
2010/0194513 A1* 8/2010 Ozawa ................... H05K 1/165 336/200
2010/0201473 A1* 8/2010 Konoue .................... H01F 5/00 336/200
2010/0225437 A1* 9/2010 Ueda ....................... H01F 17/04 336/200
2012/0169444 A1* 7/2012 Son ......................... H01L 28/10 156/89.12

(Continued)

FOREIGN PATENT DOCUMENTS

JP H04-65807 A 3/1992
JP H0465807 A * 3/1992 ............ H01F 17/00

(Continued)

*Primary Examiner* — Malcolm Barnes

(74) *Attorney, Agent, or Firm* — Studebaker & Brackett PC

(57) ABSTRACT

A multilayer coil component includes an insulator portion, a coil embedded in the insulator portion and including a plurality of coil conductor layers electrically connected together, and an outer electrode disposed on a surface of the insulator portion and electrically connected to the coil. The insulator portion is a multilayer body including first and second insulator layers. The coil conductor layers and the second insulator layers are disposed on the first insulator layers. The multilayer coil component has void layers (e.g., voids) between the first insulator layers and at least a portion of the coil conductor layers. If the thickness of the first insulator layers is a, the thickness of the coil conductor layers is b, and the thickness of the void layers is c, the ratio of c to b (c/b) is 0.10 to 0.70, and the ratio of a to b (a/b) is 0.25 to 1.00.

18 Claims, 5 Drawing Sheets

(56) References Cited

U.S. PATENT DOCUMENTS

| | | | | |
|---|---|---|---|---|
| 2012/0286917 | A1* | 11/2012 | Uchida | H01F 41/041 336/200 |
| 2012/0326827 | A1* | 12/2012 | Nanjyo | H01F 17/0033 336/200 |
| 2013/0229253 | A1* | 9/2013 | Inui | H01F 41/0206 336/200 |
| 2019/0096561 | A1* | 3/2019 | Nagai | H01F 17/0013 |
| 2021/0012947 | A1* | 1/2021 | Ishima | H01F 27/2804 |

FOREIGN PATENT DOCUMENTS

| | | | | |
|---|---|---|---|---|
| JP | 2019047015 | A | 3/2019 | |
| WO | WO-2010084794 | A1 * | 7/2010 | H01F 17/0013 |

* cited by examiner

31

31
32

31
32
37

31
33

34
33

41
33
42

41
43

41
43
44

41
45

46
45

55
56

61
55

61
63

61
63
64

61
67
63
64

61
65

71

MULTILAYER COIL COMPONENT

CROSS-REFERENCE TO RELATED APPLICATION

This application claims benefit of priority to Japanese Patent Application No. 2019-238915, filed Dec. 27, 2019, the entire contents of which is incorporated herein by reference.

BACKGROUND

Technical Field

The present disclosure relates to multilayer coil components and methods for manufacturing multilayer coil components.

Background Art

The recent trend toward a higher current in electronic devices has led to a need for a multilayer coil component with a higher rated current. An example of a multilayer coil component known in the related art includes a body and a coil disposed in the body, as described, for example, in Japanese Unexamined Patent Application Publication No. 2019-47015. The multilayer coil component disclosed in Japanese Unexamined Patent Application Publication No. 2019-47015 is manufactured by forming coil conductor layers with a thickness of about 30 μm on magnetic layers for formation of the body to obtain coil conductor printed sheets and bonding together by pressure and firing the coil conductor printed sheets.

Because multilayer coil components have increasingly been used in applications in which a high current is supplied, coil patterns need to be made thicker. In addition, there is an increasing need for achieving a stress relaxation effect, for example, by providing voids between magnetic layers and coil conductors.

SUMMARY

Accordingly, the present disclosure provides a multilayer coil component that has low direct current resistance and is therefore suitable for applications in which a high current is supplied, that is stress-relieved, and that exhibits less variation in impedance.

According to preferred embodiments of the present disclosure, there is provided a multilayer coil component including an insulator portion, a coil embedded in the insulator portion and including a plurality of coil conductor layers electrically connected together, and an outer electrode disposed on a surface of the insulator portion and electrically connected to the coil. The insulator portion is a multilayer body including first and second insulator layers. The coil conductor layers and the second insulator layers are disposed on the first insulator layers. The multilayer coil component has void layers (e.g., voids) between the first insulator layers and the coil conductor layers. If the thickness of the first insulator layers is a, the thickness of the coil conductor layers is b, and the thickness of the void layers is c, the ratio of c to b (c/b) is 0.10 to 0.70, and the ratio of a to b (a/b) is 0.25 to 1.00.

In the multilayer coil component, the coil conductor layers may have a thickness of 30 μm to 60 μm.

In the multilayer coil component, the first insulator layers may have a thickness of 10 μm to 40 μm.

In the multilayer coil component, the void layers may have a thickness of 4 μm to 28 μm.

According to preferred embodiments of the present disclosure, there is also provided a method for designing a multilayer coil component including an insulator portion, a coil embedded in the insulator portion and including a plurality of coil conductor layers electrically connected together, and an outer electrode disposed on a surface of the insulator portion and electrically connected to the coil. The insulator portion is a multilayer body including first and second insulator layers. The coil conductor layers and the second insulator layers are disposed on the first insulator layers. The multilayer coil component has void layers between the first insulator layers and the coil conductor layers. The method includes determining the thickness of the first insulator layers, the thickness of the coil conductor layers, and the thickness of the void layers such that, if the thickness of the first insulator layers is a, the thickness of the coil conductor layers is b, and the thickness of the void layers is c, the ratio of c to b (c/b) is in a range of 0.10 to 0.70, and the ratio of a to b (a/b) is in a range of 0.25 to 1.00.

According to preferred embodiments of the present disclosure, a multilayer coil component that allows a high current to flow therethrough and that has high joint reliability can be provided. According to preferred embodiments of the present disclosure, a multilayer coil component that has high joint reliability can also be provided.

Other features, elements, characteristics and advantages of the present disclosure will become more apparent from the following detailed description of preferred embodiments of the present disclosure with reference to the attached drawings.

DETAILED DESCRIPTION

A multilayer coil component according to an embodiment of the present disclosure will hereinafter be described in detail with reference to the drawings. However, the shapes, arrangements, and other details of the multilayer coil component according to the present embodiment and the individual constituent elements thereof are not limited to the illustrated example.

Figure 1:
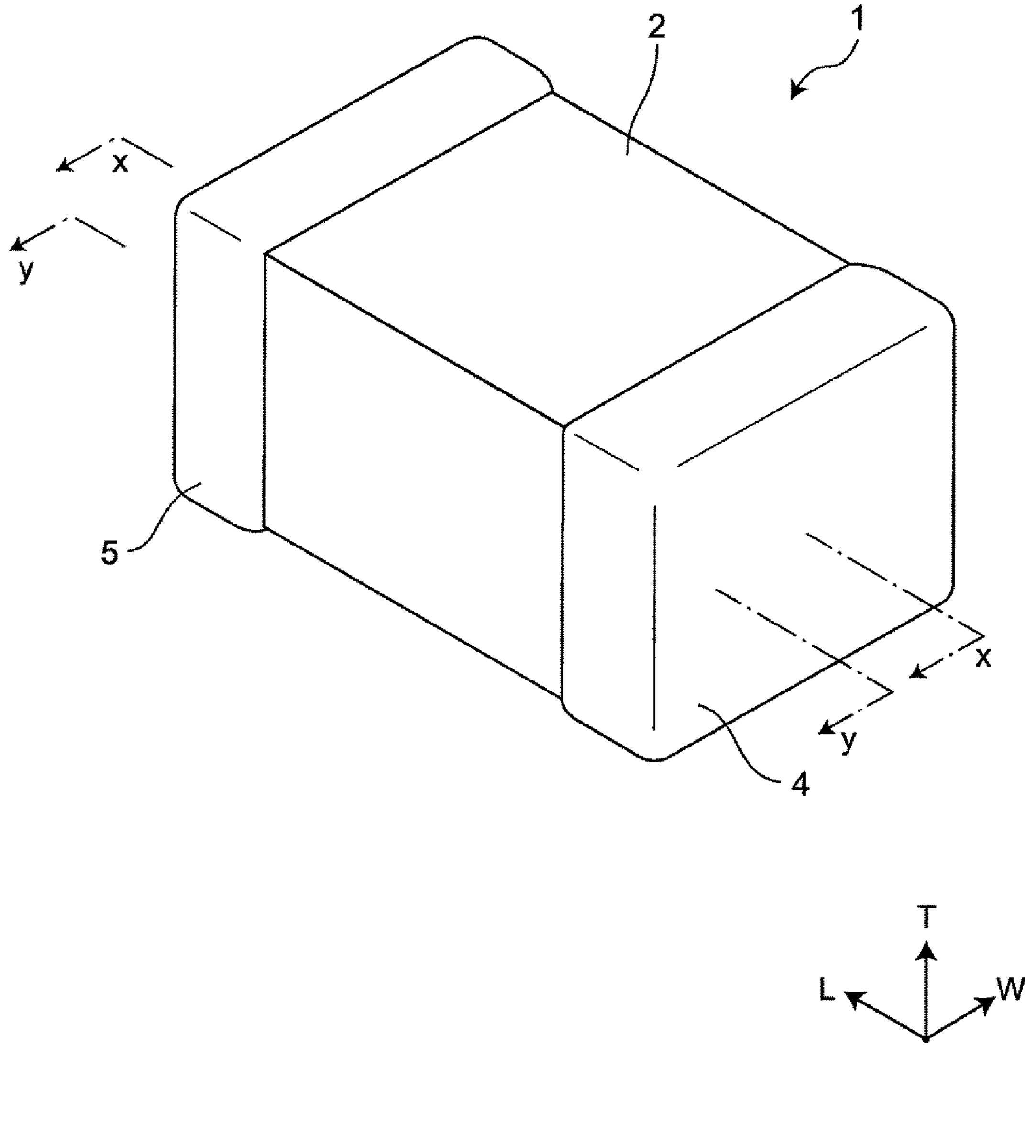
FIG. 1 is a schematic perspective view of a multilayer coil component according to an embodiment of the present disclosure.
Figure 2:
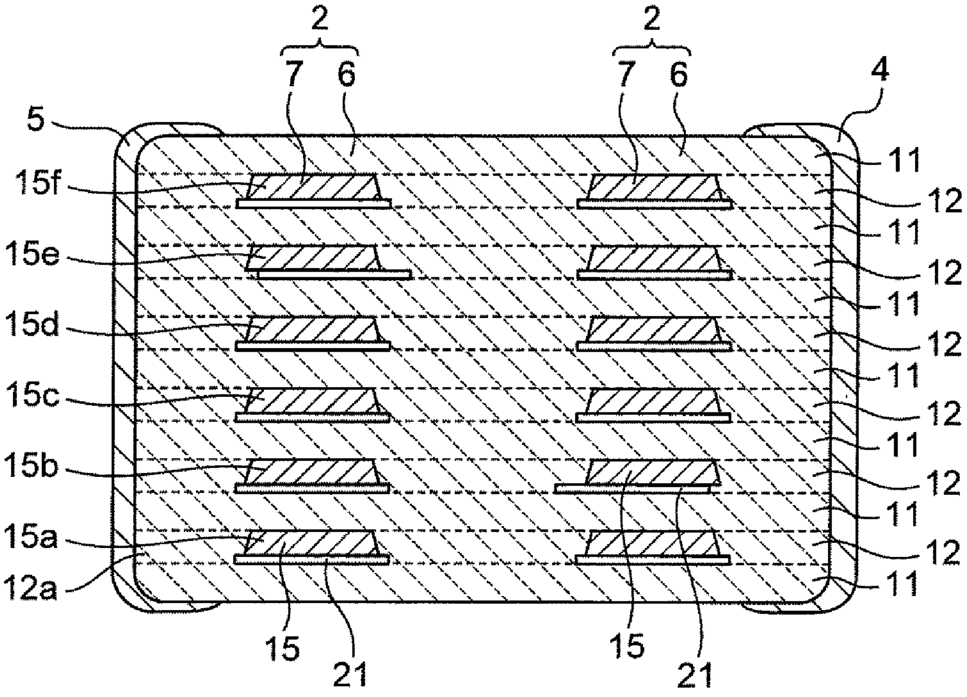
FIG. 2 is a sectional view illustrating a cross-section of the multilayer coil component taken along line x-x in FIG. 1.

FIG. 1 illustrates a perspective view of a multilayer coil component 1 according to the present embodiment. FIG. 2 illustrates a sectional view taken along line x-x in FIG. 1.

Figure 3:
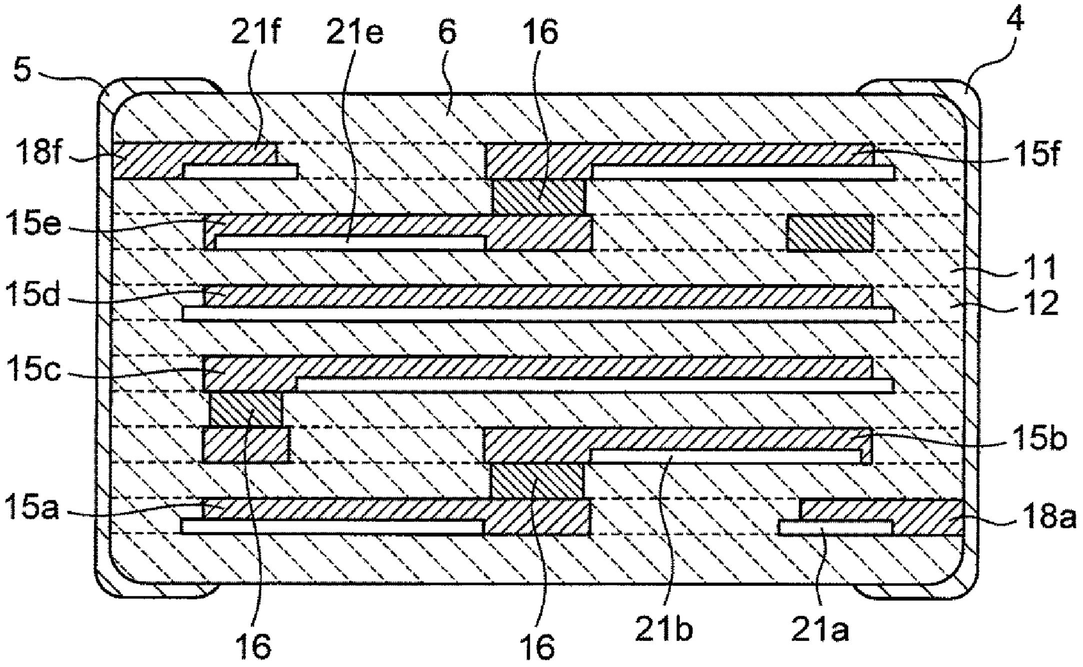
FIG. 3 is a sectional view illustrating a cross-section of the multilayer coil component taken along line y-y in FIG. 1.
Figure 4:
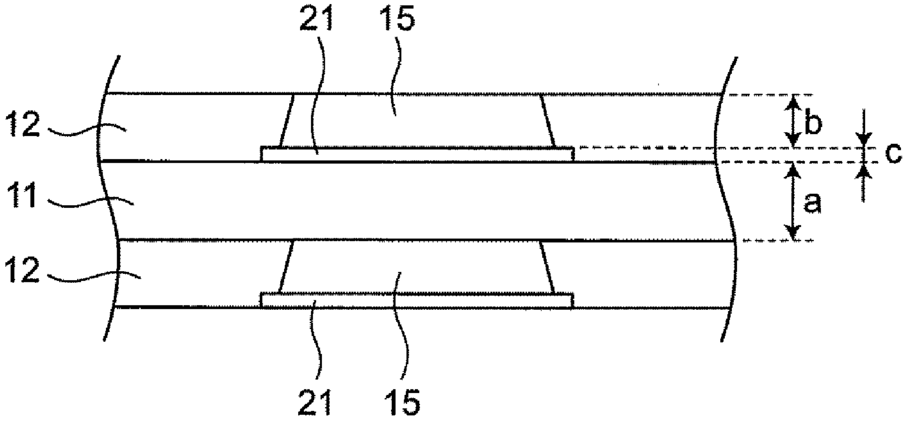
FIG. 4 is a sectional view illustrating the thicknesses of first insulator layers, coil conductor layers, and void layers of the multilayer coil component.

FIG. 3 illustrates a sectional view taken along line y-y in FIG. 1. However, the shapes, arrangements, and other details of the multilayer coil component according to the embodiment described below and the individual constituent elements thereof are not limited to the illustrated example.

As illustrated in FIGS. 1 to 3, the multilayer coil component 1 according to the present embodiment has a substantially rectangular parallelepiped shape. The surfaces of the multilayer coil component 1 perpendicular to the L axis in FIG. 1 are referred to as "end surface". The surfaces of the multilayer coil component 1 perpendicular to the W axis in FIG. 1 are referred to as "side surface". The surfaces of the multilayer coil component 1 perpendicular to the T axis in FIG. 1 are referred to as "upper surface" and "lower surface". The multilayer coil component 1 generally includes a body 2 and outer electrodes 4 and 5 disposed on both end surfaces of the body 2. The body 2 includes an insulator portion 6 and a coil 7 embedded in the insulator portion 6. The insulator portion 6 includes first insulator layers 11 and second insulator layers 12. The coil 7 is composed of coil conductor layers 15 connected together in a coil pattern via connection conductors 16 extending through the first insulator layers 11. Of the coil conductor layers 15, coil conductor layers 15*a* and 15*f* located in the lowermost and uppermost layers include extended portions 18*a* and 18*f*, respectively. The coil 7 is connected to the outer electrodes 4 and 5 via the extended portions 18*a* and 18*f*. The multilayer coil component 1 has void layers 21 (e.g., voids) between the insulator portion 6 and the main surfaces (lower main surfaces in FIGS. 2 and 3) of the coil conductor layers 15, that is, between the first insulator layers 11 and the coil conductor layers 15.

The above multilayer coil component 1 according to the present embodiment will hereinafter be described. The embodiment described herein is an embodiment in which the insulator portion 6 is formed from a ferrite material.

The body 2 of the multilayer coil component 1 according to the present embodiment is composed of the insulator portion 6 and the coil 7.

The insulator portion 6 may include the first insulator layers 11 and the second insulator layers 12.

The first insulator layers 11 are disposed between the coil conductor layers 15 adjacent to each other in the stacking direction and between the coil conductor layers 15 and the upper and lower surfaces of the body 2.

The second insulator layers 12 are disposed around the coil conductor layers 15 such that the upper surfaces (upper main surfaces in FIGS. 2 and 3) of the coil conductor layers 15 are exposed. In other words, the second insulator layers 12 form layers at the same heights as the coil conductor layers 15 in the stacking direction. For example, the second insulator layer 12*a* in FIG. 2 is located at the same height as the coil conductor layer 15*a* in the stacking direction.

That is, in the multilayer coil component according to the present embodiment, the insulator portion is a multilayer body including first and second insulator layers, the coil conductor layers are disposed on the first insulator layers, and the second insulator layers are disposed on the first insulator layers so as to be adjacent to the coil conductor layers.

The thickness of the first insulator layers 11 may preferably be about 5 μm to about 100 μm, more preferably about 10 μm to about 40 μm, even more preferably about 16 μm to about 30 μm. If the thickness is about 5 μm or more, insulation can be more reliably ensured between the coil conductor layers 15. If the thickness is about 100 μm or less, better electrical characteristics can be achieved. Here, the thickness of the first insulator layers 11 refers to the thickness of the first insulator layers 11 present between the coil conductor layers 15.

The thickness of the first insulator layers can be measured as follows.

A chip is polished, with its LT surface facing polishing paper. Polishing is stopped at the central position along the width of the coil conductor layers. Thereafter, observation is performed under a microscope. The thickness of the first insulator layers at the central position along the length of the coil conductor layers is measured by a measuring function accompanying the microscope.

In one embodiment, portions of the second insulator layers 12 may be disposed so as to extend over the outer edge portions of the coil conductor layers 15. In other words, the second insulator layers 12 may be disposed so as to cover the outer edge portions of the coil conductor layers 15. That is, as the coil conductor layers 15 and the second insulator layers 12 adjacent to each other are viewed in plan view from the upper side, the second insulator layers 12 may extend inwardly of the outer edges of the coil conductor layers 15.

The first insulator layers 11 and the second insulator layers 12 may be integrated with each other in the body 2. In this case, the first insulator layers 11 can be assumed to be present between the coil conductor layers 15, whereas the second insulator layers 12 can be assumed to be present at the same heights as the coil conductor layers 15.

The insulator portion 6 is preferably formed of a magnetic material, more preferably a sintered ferrite. The sintered ferrite contains at least Fe, Ni, and Zn as the main constituents. The sintered ferrite may further contain Cu.

The first insulator layers 11 and the second insulator layers 12 may have the same composition or different compositions. In a preferred embodiment, the first insulator layers 11 and the second insulator layers 12 have the same composition.

In one embodiment, the sintered ferrite contains at least Fe, Ni, Zn, and Cu as the main constituents.

The Fe content of the sintered ferrite on an $Fe_2O_3$ basis may preferably be about 40.0 mol % to about 49.5 mol %, more preferably about 45.0 mol % to about 49.5 mol % (based on the total amount of the main constituents; the same applies hereinafter).

The Zn content of the sintered ferrite on a ZnO basis may preferably be about 5.0 mol % to about 35.0 mol %, more preferably about 10.0 mol % to about 30.0 mol % (based on the total amount of the main constituents; the same applies hereinafter).

The Cu content of the sintered ferrite on a CuO basis is preferably about 4.0 mol % to about 12.0 mol %, more preferably about 7.0 mol % to about 10.0 mol % (based on the total amount of the main constituents; the same applies hereinafter).

The Ni content of the sintered ferrite is not particularly limited and may be the balance excluding the other main constituents described above, namely, Fe, Zn, and Cu.

In one embodiment, the sintered ferrite contains Fe in an amount, on an $Fe_2O_3$ basis, of about 40.0 mol % to about 49.5 mol %, Zn in an amount, on a ZnO basis, of about 5.0 mol % to about 35.0 mol %, and Cu in an amount, on a CuO basis, of about 4.0 mol % to about 12.0 mol %, the balance being NiO.

In the present embodiment, the sintered ferrite may further contain additive constituents. Examples of additive constituents for the sintered ferrite include, but not limited to, Mn, Co, Sn, Bi, and Si. The Mn, Co, Sn, Bi, and Si contents (amounts added) on $Mn_3O_4$, $Co_3O_4$, $SnO_2$, $Bi_2O_3$, and $SiO_2$ bases are each preferably about 0.1 parts by weight to about 1 part by weight based on a total of 100 parts by weight of the main constituents (i.e., Fe (on an $Fe_2O_3$ basis), Zn (on a ZnO basis), Cu (on a CuO basis), and Ni (on a NiO basis)). The sintered ferrite may further contain incidental impurities introduced during manufacture.

As described above, the coil 7 is composed of the coil conductor layers 15 electrically connected to each other in a coil pattern. The coil conductor layers 15 adjacent to each other in the stacking direction are connected together via the connection conductors 16 extending through the insulator portion 6 (specifically, the first insulator layers 11). In the present embodiment, the coil conductor layers 15 are referred to as, in order from the lower side, "coil conductor layers 15*a* to 15*f*". The coil conductor layers 15*a* and 15*f* include the extended portions 18*a* and 18*f*, respectively. The extended portions 18*a* and 18*f* are located at ends of the coil conductor layers 15*a* to 15*f* and are connected to the outer electrodes 4 and 5.

Examples of materials that form the coil conductor layers 15 include, but not limited to, Au, Ag, Cu, Pd, and Ni. The material that forms the coil conductor layers 15 is preferably Ag or Cu, more preferably Ag. Conductive materials may be used alone or in combination.

The thickness of the winding portions of the coil conductor layers 15 (i.e., the thickness of the portions other than the extended portions) may preferably be about 30 μm to about 60 μm, more preferably about 35 μm to about 45 μm. As the thickness of the coil conductor layers becomes larger, the resistance of the multilayer coil component becomes lower. Here, the thickness of the coil conductor layers refers to the thickness of the coil conductor layers in the stacking direction.

The thickness of the coil conductor layers can be measured as follows.

A chip is polished, with its LT surface facing polishing paper. Polishing is stopped at the central position along the width of the coil conductor layers. Thereafter, observation is performed under a microscope. The thickness at the central position along the length of the coil conductor layers is measured by a measuring function accompanying the microscope.

The connection conductors 16 are disposed so as to extend through the first insulator layers 11. The material that forms the connection conductors 16 may be any of the materials as mentioned for the coil conductor layers 15. The material that forms the connection conductors 16 may be the same as or different from the material that forms the coil conductor layers 15. In a preferred embodiment, the material that forms the connection conductors 16 is the same as the material that forms the coil conductor layers 15. In a preferred embodiment, the material that forms the connection conductors 16 is Ag.

The void layers 21 function as so-called stress relaxation spaces.

The thickness of the void layers 21 is preferably about 1 μm to about 30 μm, more preferably about 4 μm to about 28 μm, even more preferably about 10 μm to about m. If the thickness of the void layers 21 falls within the above range, the internal stress can be further relieved, and cracking can thus be further inhibited.

The thickness of the void layers can be measured as follows.

A chip is polished, with its LT surface facing polishing paper. Polishing is stopped at the central position along the width of the coil conductor layers. Thereafter, observation is performed under a microscope. The thickness of the void layers at the central position along the length of the coil conductor layers is measured by a measuring function accompanying the microscope.

In one embodiment, as illustrated in FIG. 2, the void layers 21 have a larger width than the coil conductor layers 15 in a cross-section perpendicular to the winding direction of the coil. That is, the void layers 21 are provided so as to extend beyond both edges of the coil conductor layers 15 in directions away from the coil conductor layers 15.

In one embodiment, the void layers 21 at the winding portions 17 have one main surface thereof in contact with the insulator portion 6 and the other portion thereof in contact with any of the coil conductor layers 15. The void layers 21 have one main surface thereof in contact with any of the first insulator layers 11 and the other surface thereof in contact with any of the coil conductor layers 15. In other words, the void layers 21 over the first insulator layers 11 are covered by the coil conductor layers 15.

In the multilayer coil component 1 according to the present embodiment, the coil conductor layers 15 and the second insulator layers 12 are disposed on the first insulator layers 11, and the void layers 21 are provided between the first insulator layers 11 and the coil conductor layer 15. In other words, in the multilayer coil component 1 according to the present embodiment, the first insulator layers 11, the void layers 21, and the coil conductor layers 15 are alternately stacked on top of each other in this order.

The outer electrodes 4 and 5 are disposed so as to cover both end surfaces of the body 2. The outer electrodes are formed of a conductive material, preferably one or more metal materials selected from Au, Ag, Pd, Ni, Sn, and Cu.

The outer electrodes may be composed of a single layer or a plurality of layers. In one embodiment, the outer electrodes may be composed of a plurality of layers, preferably two to four layers, for example, three layers.

In one embodiment, the outer electrodes may be composed of a plurality of layers including a layer containing Ag or Pd, a layer containing Ni, or a layer containing Sn. In a preferred embodiment, the outer electrodes are composed of a layer containing Ag or Pd, a layer containing Ni, and a layer containing Sn. Preferably, the outer electrodes are composed of, in sequence from the coil conductor layer side, a layer containing Ag or Pd, preferably Ag, a layer containing Ni, and a layer containing Sn. Preferably, the layer containing Ag or Pd is a layer formed by baking a Ag paste or a Pd paste, and the layer containing Ni and the layer containing Sn may be plating layers.

The multilayer coil component according to the present embodiment preferably has a length of about 0.4 mm to about 3.2 mm, a width of about 0.2 mm to about 2.5 mm, and a height of about 0.2 mm to about 2.0 mm, more preferably a length of about 0.6 mm to about 2.0 mm, a width of about 0.3 mm to about 1.3 mm, and a height of about 0.3 mm to about 1.0 mm.

In the multilayer coil component 1 according to the present embodiment, if the thickness of the first insulator layers is a, the thickness of the coil conductor layers is b, and the thickness of the void layers is c, the ratio of c to b (c/b) is about 0.10 to about 0.70, and the ratio of a to b (a/b) is about 0.25 to about 1.00.

Multilayer coil components with such c/b and a/b ratios exhibit less variation in impedance. In a preferred embodiment, each multilayer coil component has low direct current resistance and also achieves a large stress relaxation effect.

In a preferred embodiment, the ratio of c to b (c/b) is about 0.15 to about 0.70, and the ratio of a to b (a/b) is about 0.30 to about 1.00.

In a more preferred embodiment, the ratio of c to b (c/b) is about 0.25 to about 0.70, and the ratio of a to b (a/b) is about 0.40 to about 1.00.

In a preferred embodiment, the ratio of c to b (c/b) is about 0.10 to about 0.70, the ratio of a to b (a/b) is about 0.25 to about 1.00, and the coil conductor layers have a thickness of about 30 μm to about 60 μm.

In a more preferred embodiment, the ratio of c to b (c/b) is about 0.10 to about 0.70, the ratio of a to b (a/b) is about 0.25 to about 1.00, the coil conductor layers have a thickness of about 30 μm to about 60 μm, and the first insulator layers have a thickness of about 10 μm to about 40 μm.

In an even more preferred embodiment, the ratio of c to b (c/b) is about 0.10 to about 0.70, the ratio of a to b (a/b) is about 0.25 to about 1.00, the coil conductor layers have a thickness of about 30 μm to about 60 μm, the first insulator layers have a thickness of about 10 μm to about 40 μm, and the void layers have a thickness of about 4 μm to about 28 μm.

A method for manufacturing the above multilayer coil component 1 according to the present embodiment will hereinafter be described. The embodiment described herein is an embodiment in which the insulator portion 6 is formed from a ferrite material.

(1) Preparation of Ferrite Paste

A ferrite material is first prepared. The ferrite material contains Fe, Zn, and Ni as the main constituents and further contains Cu as desired. Typically, the main constituents of the ferrite material are substantially composed of Fe, Zn, Ni, and Cu oxides (ideally, $Fe_2O_3$, ZnO, NiO, and CuO).

As the ferrite material, $Fe_2O_3$, ZnO, CuO, NiO, and optionally additive constituents are weighed so as to give a predetermined composition and are mixed and pulverized. The pulverized ferrite material is dried and calcined to obtain a calcined powder. Predetermined amounts of a solvent (e.g., a ketone-based solvent), a resin (e.g., polyvinyl acetal), and a plasticizer (e.g., an alkyd-based plasticizer) are added to the calcined powder, and they are mixed in a machine such as a planetary mixer and are further dispersed in a machine such as a three-roll mill. Thus, a ferrite paste can be prepared.

The Fe content of the ferrite material on an $Fe_2O_3$ basis may preferably be about 40.0 mol % to about 49.5 mol %, more preferably about 45.0 mol % to about 49.5 mol % (based on the total amount of the main constituents; the same applies hereinafter).

The Zn content of the ferrite material on a ZnO basis may preferably be about 5.0 mol % to about 35.0 mol %, more preferably about 10.0 mol % to about 30.0 mol % (based on the total amount of the main constituents; the same applies hereinafter).

The Cu content of the ferrite material on a CuO basis is preferably about 4.0 mol % to about 12.0 mol %, more preferably about 7.0 mol % to about 10.0 mol % (based on the total amount of the main constituents; the same applies hereinafter).

The Ni content of the ferrite material is not particularly limited and may be the balance excluding the other main constituents described above, namely, Fe, Zn, and Cu.

In one embodiment, the ferrite material contains Fe in an amount, on an $Fe_2O_3$ basis, of about 40.0 mol % to about 49.5 mol %, Zn in an amount, on a ZnO basis, of about 5.0 mol % to about 35.0 mol %, and Cu in an amount, on a CuO basis, of about 4.0 mol % to about 12.0 mol %, the balance being NiO.

In the present embodiment, the ferrite material may further contain additive constituents. Examples of additive constituents for the ferrite material include, but not limited to, Mn, Co, Sn, Bi, and Si. The Mn, Co, Sn, Bi, and Si contents (amounts added) on $Mn_3O_4$, $Co_3O_4$, $SnO_2$, $Bi_2O_3$, and $SiO_2$ bases are each preferably about 0.1 parts by weight to about 1 part by weight based on a total of 100 parts by weight of the main constituents (i.e., Fe (on an $Fe_2O_3$ basis), Zn (on a ZnO basis), Cu (on a CuO basis), and Ni (on a NiO basis)). The ferrite material may further contain incidental impurities introduced during manufacture.

The Fe content (on an $Fe_2O_3$ basis), Mn content (on a $Mn_2O_3$ basis), Cu content (on a CuO basis), Zn content (on a ZnO basis), and Ni content (on a NiO basis) of the sintered ferrite may be assumed to be substantially equal to the Fe content (on an $Fe_2O_3$ basis), Mn content (on a $Mn_2O_3$ basis), Cu content (on a CuO basis), Zn content (on a ZnO basis), and Ni content (on a NiO basis) of the ferrite material before firing.

(2) Preparation of Conductive Paste for Coil Conductors

A conductive material is first prepared. The conductive material may be, for example, Au, Ag, Cu, Pd, or Ni, preferably Ag or Cu, more preferably Ag. A predetermined amount of a powder of the conductive material is weighed and mixed with predetermined amounts of a solvent (e.g., eugenol), a resin (e.g., ethylcellulose), and a dispersant in a machine such as a planetary mixer and is then dispersed in a machine such as a three-roll mill. Thus, a conductive paste for coil conductors can be prepared.

(3) Preparation of Resin Paste

A resin paste for formation of void layers in the multilayer coil component 1 is prepared. The resin paste can be prepared by adding a resin (e.g., an acrylic resin) that disappears during firing to a solvent (e.g., isophorone).

(4) Fabrication of Multilayer Coil Component (4-1) Fabrication of Body

Figures 5A, 5B, 5C, 5D, 5E, 5F, 5G, 5H, 5I, 5J, 5K, 5L, 5M, 5N, 5O, 5P, 5Q:
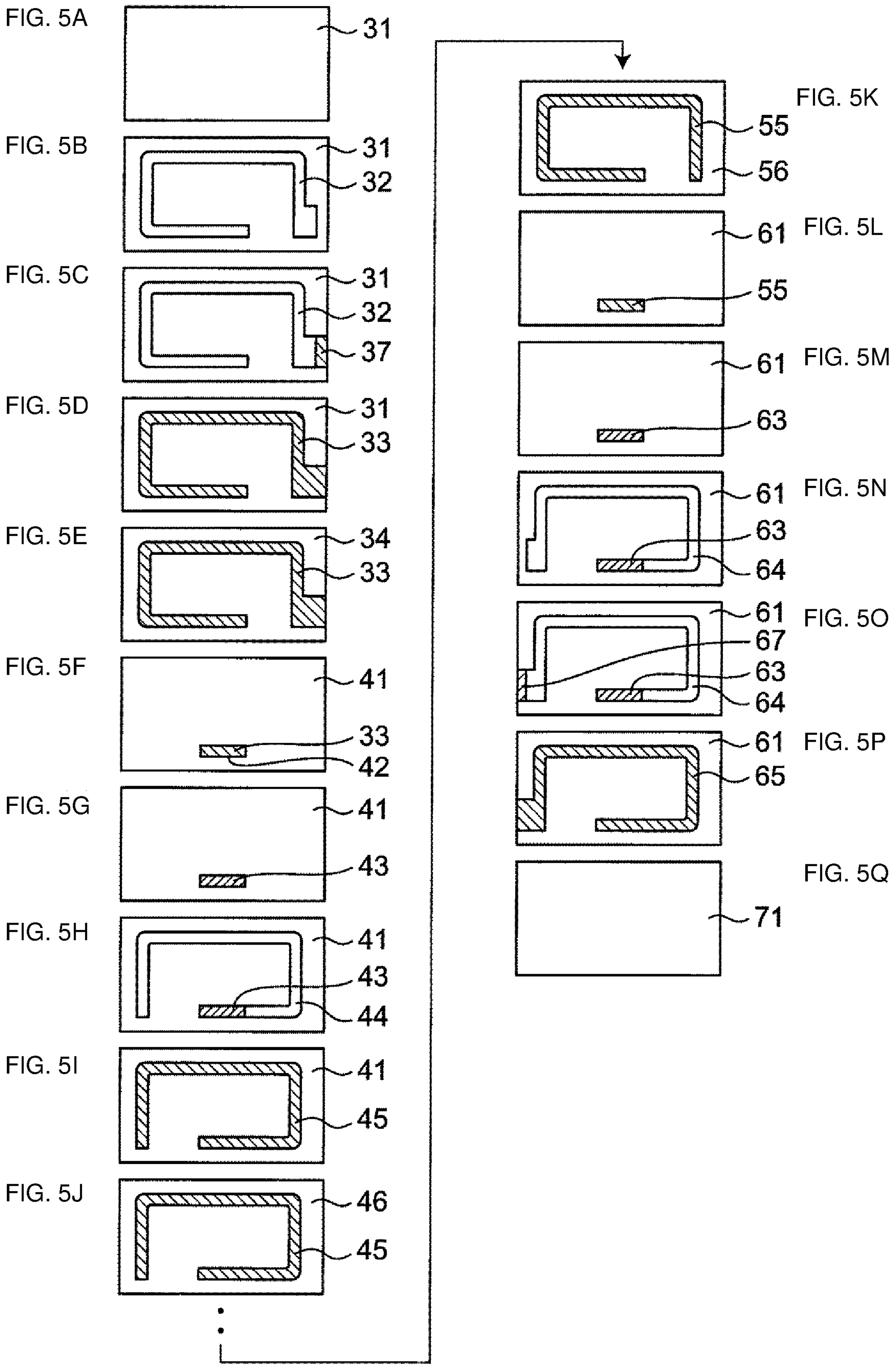
FIGS. 5A to 5Q are plan views illustrating a method for manufacturing the multilayer coil component illustrated in FIG. 1.

A thermal release sheet and a polyethylene terephthalate (PET) film are first stacked on a metal plate (not illustrated). The ferrite paste is applied by printing a predetermined number of times to form a first ferrite paste layer 31 that forms an outer layer (FIG. 5A). This layer corresponds to the first insulator layers 11.

The resin paste is then applied by printing to the area where the void layer 21*a* is to be formed to form a resin paste layer 32 (FIG. 5B).

The conductive paste is then applied by printing to the area where the extended portion 18 is to be formed between the resin paste layer 32 and the end surface to form an extended conductor additional layer 37 (FIG. 5C). The extended conductor additional layer 37 corresponds to a thicker portion of the above extended portion 18.

The conductive paste is then applied by printing to the entire area where the coil conductor layer 15*a* is to be formed to form a conductive paste layer 33 (FIG. 5D).

The ferrite paste is then applied by printing to the region where the conductive paste layer 33 is not formed to form a second ferrite paste layer 34 (FIG. 5E). The second ferrite paste layer 34 is preferably provided so as to cover the outer edge portions of the conductive paste layer 33. This layer corresponds to the second insulator layers 12.

The ferrite paste is then applied by printing to the region other than the area where a connection conductor for connecting coil conductor layers adjacent to each other in the stacking direction is to be formed to form a first ferrite paste layer 41 (FIG. 5F). This layer corresponds to the first insulator layers 11. A hole 42 is formed in the area where the connection conductor is to be formed.

The conductive paste is then applied by printing to the hole 42 to form a connection conductor paste layer 43 (FIG. 5G).

Steps similar to those in FIGS. 5B to 5G are then repeated as appropriate to form the individual layers illustrated in FIGS. 2 and 3 (e.g., FIGS. 5H to 5P). Finally, the ferrite paste is applied by printing a predetermined number of times to form a first ferrite paste layer 71 that forms an outer layer (FIG. 5Q). This layer corresponds to the first insulator layers 11.

The layers are then bonded together on the metal plate by pressure, followed by cooling and removal of the metal plate and then the PET film to obtain an element assembly (unfired multilayer block)). This unfired multilayer block is cut into individual bodies with a tool such as a dicer.

The resulting unfired bodies are subjected to barrel finishing to round the corners of the bodies. Barrel finishing may be performed either on the unfired multilayer bodies or on fired multilayer bodies. Barrel finishing may be performed either by a dry process or by a wet process. Barrel finishing may be performed by polishing the elements either with each other or with media.

After barrel finishing, the unfired bodies are fired at a temperature of, for example, about 910° C. to about 935° C. to obtain bodies 2 for multilayer coil components 1.

After firing, the resin paste layers disappear, thus forming the void layers 21.

(4-2) Formation of Outer Electrodes

A Ag paste containing Ag and glass for formation of outer electrodes is then applied to the end surfaces of the bodies 2 and is baked to form underlying electrodes. A Ni coating and a Sn coating are then formed in sequence over the underlying electrodes by electrolytic plating to form outer electrodes. Thus, multilayer coil components 1 as illustrated in FIG. 1 are obtained.

Although one embodiment of the present disclosure has been described above, various modifications can be made to the present embodiment.

For example, in the above embodiment, elements may be obtained by preparing ferrite sheets corresponding to the individual insulating layers, forming coil patterns on the sheets by printing, and bonding the sheets together by pressure.

The multilayer coil components manufactured by the above method according to the present embodiment have low direct current resistance and thus allow a high current to flow therethrough, and are also stress-relieved and thus have a reduced susceptibility to cracking.

The present embodiment provides a method for designing a multilayer coil component that has low direct current resistance and that is stress-relieved. Specifically, the present embodiment provides a method for designing a multilayer coil component including an insulator portion, a coil embedded in the insulator portion and including a plurality of coil conductor layers electrically connected together, and an outer electrode disposed on a surface of the insulator portion and electrically connected to the coil. The insulator portion is a multilayer body including first and second insulator layers. The coil conductor layers and the second insulator layers are disposed on the first insulator layers. The multilayer coil component has void layers between the first insulator layers and the coil conductor layers. The method includes determining the thickness of the first insulator layers, the thickness of the coil conductor layers, and the thickness of the void layers such that, if the thickness of the first insulator layers is a, the thickness of the coil conductor layers is b, and the thickness of the void layers is c, the ratio of c to b (c/b) is in a range of about 0.10 to about 0.70, and the ratio of a to b (a/b) is in a range of about 0.25 to about 1.00. The design method according to the present embodiment facilitates design of a multilayer coil component that has low direct current resistance and thus allows a high current to flow therethrough and that is stress-relieved.

The present disclosure will now be described with reference to the following examples, although the present disclosure is not limited to these examples.

EXAMPLES

Examples

Preparation of Ferrite Paste

Powders of $Fe_2O_3$, ZnO, CuO, and NiO were weighed such that the amounts thereof were 49.0 mol %, 25.0 mol %, 8.0 mol %, and the balance, respectively, based on the total amount of the powders. These powders were mixed and pulverized, were dried, and were calcined at 700° C. to obtain a calcined powder. Predetermined amounts of a ketone-based solvent, polyvinyl acetal, and an alkyd-based plasticizer were added to the calcined powder, and they were mixed in a planetary mixer and were further dispersed in a three-roll mill. Thus, a ferrite paste was prepared.

Preparation of Conductive Paste for Coil Conductors

A predetermined amount of silver powder was prepared as a conductive material.

The silver powder was mixed with eugenol, ethylcellulose, and a dispersant in a planetary mixer and was then dispersed in a three-roll mill. Thus, a conductive paste for coil conductors was prepared.

Preparation of Resin Paste

A resin paste was prepared by mixing isophorone with an acrylic resin.

Fabrication of Multilayer Coil Component

Unfired multilayer blocks were fabricated by the procedure illustrated in FIGS. 5A to 5Q using the ferrite paste, the conductive paste, and the resin paste. During this procedure, printing was performed such that the thickness a of the first insulator layers, the thickness b of the coil conductor layers, and the thickness c of the void layers were as shown in Table 1.

The multilayer blocks were then cut into individual elements with a dicer. The resulting elements were subjected to barrel finishing to round the corners of the elements. After barrel finishing, the elements were fired at a temperature of 920° C. to obtain bodies.

A Ag paste containing Ag and glass for formation of outer electrodes was then applied to the end surfaces of the bodies and was baked to form underlying electrodes. A Ni coating and a Sn coating were then formed in sequence over the underlying electrodes by electrolytic plating to form outer electrodes. Thus, multilayer coil components were obtained.

The multilayer coil components obtained as described above each had a length (L) of 1.6 mm, a width (W) of 0.8 mm, and a height (T) of 0.8 mm.

Evaluation

For each type of multilayer coil component, the impedances Z at 100 MHz of 10 multilayer coil components obtained as described above were measured with an impedance analyzer (model No. E4991A) available from Agilent Technologies, Inc., and the average thereof was calculated.

Figure 6:
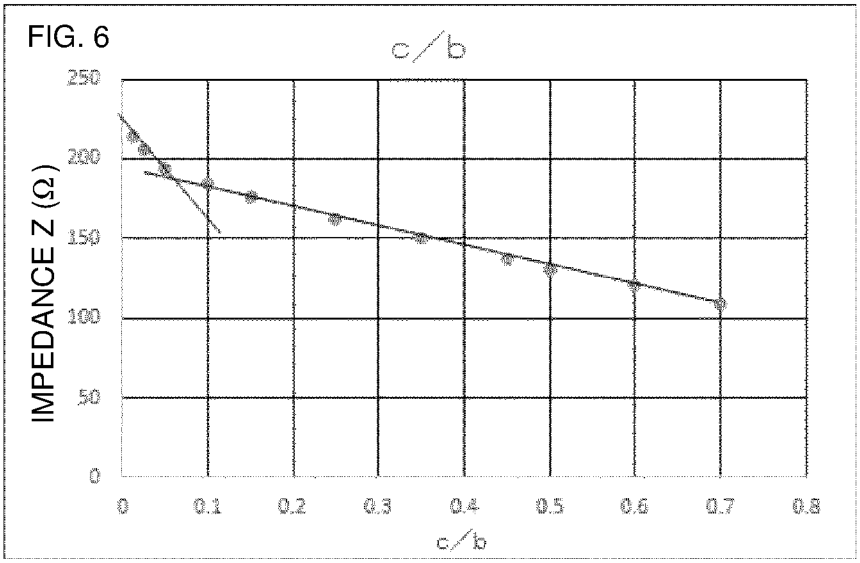
FIG. 6 is a graph plotting the impedance Z against the c/b ratio of multilayer coil components in the Examples.
Figure 7:
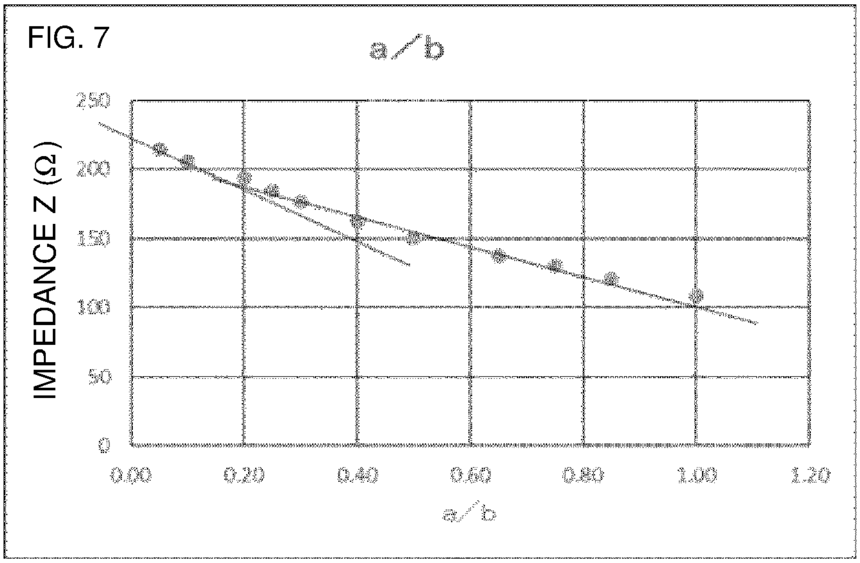
FIG. 7 is a graph plotting the impedance Z against the a/b ratio of the multilayer coil components in the Examples.

The results are summarized in Table 1 below, where Sample Nos. 1 to 3, marked with *, are comparative examples. In addition, FIGS. 6 and 7 plot the impedance Z against the c/b ratio and the a/b ratio, respectively.

TABLE 1

| Sample No. | a (μm) | b (μm) | c (μm) | c/b | a/b | Impedance Z (Ω) |
|---|---|---|---|---|---|---|
| *1 | 2 | 40 | 0.5 | 0.01 | 0.05 | 214.3 |
| *2 | 4 | 40 | 1 | 0.03 | 0.10 | 205.8 |
| *3 | 8 | 40 | 2 | 0.05 | 0.20 | 193.9 |
| 4 | 10 | 40 | 4 | 0.10 | 0.25 | 184.3 |
| 5 | 12 | 40 | 6 | 0.15 | 0.30 | 176.3 |
| 6 | 16 | 40 | 10 | 0.25 | 0.40 | 162.3 |
| 7 | 20 | 40 | 14 | 0.35 | 0.50 | 150.3 |
| 8 | 26 | 40 | 18 | 0.45 | 0.65 | 137.4 |
| 9 | 30 | 40 | 20 | 0.50 | 0.75 | 130.5 |
| 10 | 34 | 40 | 24 | 0.60 | 0.85 | 120.6 |
| 11 | 40 | 40 | 28 | 0.70 | 1.00 | 108.6 |

The results show that Sample Nos. 4 to 11, which had a c/b ratio of 0.10 to 0.70 and an a/b ratio of 0.25 to 1.00, exhibited less variation in impedance, demonstrating that multilayer coil components with less variation in impedance can be obtained. Such multilayer coil components are compatible with high currents and can also achieve a stress relaxation effect.

Multilayer coil components according to embodiments of the present disclosure can be used in a wide variety of applications including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

an insulator portion;

a coil embedded in the insulator portion and including a plurality of coil conductor layers electrically connected together; and an outer electrode disposed on a surface of the insulator portion and electrically connected to the coil, wherein the insulator portion is a multilayer body including first insulator layers and second insulator layers, at least one of the coil conductor layers and at least one of the second insulator layers are disposed adjacent to at least one of the first insulator layers, with the at least one of the second insulator layers contacting the at least one of the first insulator layers, and at least one void existing between the at least one of the first insulator layers and at least a portion of the at least one of the coil conductor layers, when a thickness of the first insulator layer is a, a thickness of the coil conductor layer is b, and a thickness of the void is c, a ratio of c to b (c/b) is 0.10 to 0.70, and a ratio of a to b (a/b) is 0.25 to 1.00, and the void exists on only one surface of the portion of the at least one of the coil conductor layers.

2. The multilayer coil component according to claim 1, wherein the coil conductor layer has a thickness of 30 μm to 60 μm.

3. The multilayer coil component according to claim 2, wherein the first insulator layer has a thickness of 10 μm to 40 μm.

4. The multilayer coil component according to claim 2, wherein the void has a thickness of 4 μm to 28 μm.

5. The multilayer coil component according to claim 3, wherein the void has a thickness of 4 μm to 28 μm.

6. The multilayer coil component according to claim 1, wherein the first insulator layer has a thickness of 10 μm to 40 μm.

7. The multilayer coil component according to claim 6, wherein the void has a thickness of 4 μm to 28 μm.

8. The multilayer coil component according to claim 1, wherein the void has a thickness of 4 μm to 28 μm.

9. A method for manufacturing a multilayer coil component including:

an insulator portion;

a coil embedded in the insulator portion and including a plurality of coil conductor layers electrically connected together; and an outer electrode disposed on a surface of the insulator portion and electrically connected to the coil, wherein the insulator portion is a multilayer body including first insulator layers and second insulator layers, at least one of the coil conductor layers and at least one of the second insulator layers are disposed adjacent to at least one of the first insulator layers, with the at least one of the second insulator layers contacting the at least one of the first insulator layers, and at least one void existing between the at least one of the first insulator layers and at least a portion of the at least one of the coil conductor layers, and the void exists on only one surface of the portion of the at least one of the coil conductor layers, the method comprising:

determining a thickness of the first insulator layer, a thickness of the coil conductor layer, and a thickness of the void such that, when the thickness of the first insulator layer is a, the thickness of the coil conductor layer is b, and the thickness of the void is c, a ratio of c to b (c/b) is in a range of 0.10 to 0.70, and a ratio of a to b (a/b) is in a range of 0.25 to 1.00.

10. The method according to claim 9, wherein the coil conductor layer has a thickness of 30 μm to 60 μm.

11. The method according to claim 10, wherein the first insulator layer has a thickness of 10 μm to 40 μm.

12. The method according to claim 10, wherein the void has a thickness of 4 μm to 28 μm.

13. The method according to claim 11, wherein the void has a thickness of 4 μm to 28 μm.

14. The method according to claim 9, wherein the first insulator layer has a thickness of 10 μm to 40 μm.

15. The method according to claim 14, wherein the void has a thickness of 4 μm to 28 μm.

16. The method according to claim 9, wherein the void has a thickness of 4 μm to 28 μm.

17. A multilayer coil component comprising:

an insulator portion;

a coil embedded in the insulator portion and including a plurality of coil conductor layers electrically connected together; and an outer electrode disposed on a surface of the insulator portion and electrically connected to the coil, wherein the insulator portion is a multilayer body including first insulator layers and second insulator layers, at least one of the coil conductor layers and at least one of the second insulator layers are disposed adjacent to at least one of the first insulator layers, with the at least one of the second insulator layers contacting the at least one of the first insulator layers, and at least one void existing between the at least one of the first insulator layers and at least a portion of the at least one of the coil conductor layers, when a thickness of the first insulator layer is a, a thickness of the coil conductor layer is b, and a thickness of the void is c, a ratio of c to b (c/b) is 0.10 to 0.70, and a ratio of a to b (a/b) is 0.25 to 1.00, and the at least one void has a larger width than the portion of the at least one of the coil conductor layers in a cross-section perpendicular to a winding direction of the coil.

18. A method for manufacturing a multilayer coil component including:

an insulator portion;

a coil embedded in the insulator portion and including a plurality of coil conductor layers electrically connected together; and an outer electrode disposed on a surface of the insulator portion and electrically connected to the coil, wherein the insulator portion is a multilayer body including first insulator layers and second insulator layers, at least one of the coil conductor layers and at least one of the second insulator layers are disposed adjacent to at least one of the first insulator layers, with the at least one of the second insulator layers contacting the at least one of the first insulator layers, and at least one void existing between the at least one of the first insulator layers and at least a portion of the at least one of the coil conductor layers, and the at least one void has a larger width than the portion of the at least one of the coil conductor layers in a cross-section perpendicular to a winding direction of the coil, the method comprising:

determining a thickness of the first insulator layer, a thickness of the coil conductor layer, and a thickness of the void such that, when the thickness of the first insulator layer is a, the thickness of the coil conductor layer is b, and the thickness of the void is c, a ratio of c to b (c/b) is in a range of 0.10 to 0.70, and a ratio of a to b (a/b) is in a range of 0.25 to 1.00.

* * * * *